(12) United States Patent
de Tremiolles et al.

(10) Patent No.: US 6,748,405 B2
(45) Date of Patent: Jun. 8, 2004

(54) METHOD AND CIRCUITS FOR PERFORMING THE QUICK SEARCH OF THE MINIMUM/MAXIMUM VALUE AMONG A SET OF NUMBERS

(75) Inventors: Ghislain Imbert de Tremiolles, Saint-Paul (FR); Didier Louis, Fontainebleau (FR); Pascal Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 09/754,639

(22) Filed: Jan. 4, 2001

(65) Prior Publication Data

US 2001/0013048 A1 Aug. 9, 2001

(30) Foreign Application Priority Data

Jan. 6, 2000 (EP) .............................. 00480010

(51) Int. Cl.[7] .............................................. G06F 7/00
(52) U.S. Cl. ...................................................... 708/207
(58) Field of Search ................................ 708/202, 207, 708/304, 671; 340/146.2

(56) References Cited

U.S. PATENT DOCUMENTS 4,998,219 A * 3/1991 Frauenglass ................. 708/207
6,115,725 A * 9/2000 Shibata et al. ............... 708/203
6,446,101 B1 * 9/2002 Braun ......................... 708/207

* cited by examiner

Primary Examiner—Chuong Dinh Ngo
(74) Attorney, Agent, or Firm—Jay H. Anderson

(57) ABSTRACT

In the search of the minimum value among a set of p Numbers coded on q bits, each Number is split into K sub-values coded on n bits ($q>=K\times n$). Parameter K thus assigns a rank to each sub-value so that K slices of bits are formed wherein each slice is composed of sub-values of the same rank. Each sub-value is then encoded on m bits ($m>n$) using a "thermometric" coding technique. A parallel search is then performed on the first slice of encoded sub-values (MSBs) to determine the minimum sub-value of that slice. All the Numbers associated to sub-values that are greater than the minimum sub-value that has been evaluated are deselected. The evaluation process is continued the same way until the last slice (LSBs) has been processed. At the end of the evaluation process, the Number which remains selected has the minimum value. The response time (i.e. the number of processing steps) now only depends upon the number K of sub-values in which the Numbers have been split up. The method applies to search the maximum as well.

9 Claims, 8 Drawing Sheets

METHOD AND CIRCUITS FOR PERFORMING THE QUICK SEARCH OF THE MINIMUM/MAXIMUM VALUE AMONG A SET OF NUMBERS

FIELD OF INVENTION

The present invention relates to techniques to search a number having a determined value in a set of numbers and more particularly to a method and circuits for searching the number having the minimum/maximum value in this set of numbers. The described solution allows a very fast search, improving thereby the response time and also providing a constant time response whatever the quantity of numbers among said set in which the minimum/maximum search is conducted.

BACKGROUND OF THE INVENTION

In today's computing processes, the search of the minimum or maximum value among a set of numbers is extensively performed in various technical fields such as in optimization, artificial neural networks, signal processing, etc. The resulting value is used in subsequent computation tasks or to undertake any appropriate action, e.g. to select a circuit associated thereto. Because, it is highly desirable that the search must be performed as fast as possible, this objective can only be met by using high performance and expensive dedicated circuits. To date, several solutions exist to solve this acute problem, that are implemented in hardware, typically in a silicon chip, with more or less difficulty.

For instance, the most known method to determine the number having the minimum value among a set of numbers consists in comparing a number with another number of the set, selecting the number having the lowest value and then proceeding the same way with the selected number until all the numbers of the set have been processed, to identify the number(s) having the minimum value. obviously, this solution which requires a lot of processing steps that are sequentially performed is not optimized and presents major drawbacks. As known for those skilled in the art, the response time is prohibitive. This solution, and more generally all solutions that are derived therefrom, have response time that are not acceptable for most applications to date mainly because they are based on sequential processing algorithms. Moreover, the response time is degraded because it is function of the precision (the number q of bits used to code said numbers) and also depends upon the quantity of numbers in which the minimum/maximum value is searched.

Another approach consists in a simultaneous evaluation (i.e. in a parallel way) of all the bits of a same weight for the totality of the numbers in which the minimum/maximum value is searched. Such a parallel approach has been recently described in the technical literature in connection with an advanced family of neural silicon chips that are manufactured and commercialized by IBM France under the ZISC036 label (ZISC is a registered Trade Mark of IBM Corp). For more details, one may refer to U.S. Pat. No. 5,740,326 entitled "Circuit for Searching/Sorting Data in Neural Networks" assigned to the same assignee.

The principle of this approach will be briefly explained by reference to FIG. 1, assuming that p numbers (referred to hereinbelow as Number 1 to Number p) coded on q bits are processed. Now turning to FIG. 1, circuit 10 which is comprised of p blocks 11 referenced 11-1 to 11-p (one per Number to be searched) processes a one bit slice, in this case the second bit (bit 2 or Bit2) of said Numbers. Note that all the q slices are of identical construction. In essence, a block 11 is quite similar to the circuit shown in FIG. 28B of the above cited U.S. patent. For instance, block 11-1 comprises a two-way OR gate 12-1, a two-way AND gate 13-1 and a two-way OR gate 14-1. The two latter gates form sub-block 15-1 that has the key role of selecting/deselecting the Number associated thereto, Number 1 in this case. Using the same terminology as in the above cited U.S. patent, signals $Exout_{1-2}$ and $Bit_{1-2}$ are applied to OR gate 12-1. Signals $Exout_{1-2}$ and $Bit_{1-2}$ represent the state of Number 1 (i.e. selected or deselected) and the value of bit 2 for that Number 1 respectively. The same construction applies to all blocks 11-1 to 11-p. The outputs of OR gates 12-1 to 12-p are applied to a p-way AND gate 16 (AND gate 16 needs as many inputs as there are Numbers to be simultaneously processed) to produce a signal which is inverted in inverter 17. AND gate 16 and inverter 17 form block 18. The resulting signal is applied to a first input of all AND gates 13-1 to 13-p whose other input receives the corresponding Bit signal i.e. $Bit_{1-2}$ to $Bit_{1-2}$. The outputs of AND gates 13-1 to 13-p and the corresponding Exout signals, i.e. $Exout_{1-2}$ to $Exout_{p-2}$ are applied to OR gates 14-1 to 14-p respectively. The signals that are output by OR gates 14-1 to 14-p are labeled $Exout_{1-3}$ to $Exout_{p-3}$ to still remain consistent with that terminology. Block 18 which is common for all the p blocks 11-1 to 11-p allows to determine the minimum value for bit 2 of the p numbers, i.e. for one bit only. For example, in order to do this comparison to select the minimum value, each slice of one bit of all Numbers 1 to p is processed in sequence, one slice per step (e.g. per clock cycle) from the most significant bit (MSB) to the less significant bit (LSB). The response time of this method is then function of the quantity q of slices, i.e. the number of bits used to code Number 1 to Number p. Thus, this solution is parallel for what concerns the p Numbers and sequential for what concerns the q bits of coding. So that, whatever the value of p, the computational time depends only of the number of bits/slices q. As shown in FIG. 1, the Exout signal, representing the exclusion bit, is used to select/deselect the corresponding Number during the evaluation process. A Number is selected as long as the Exout signal is equal to a logic "0" and it is deselected as soon as it is equal to a logic "1". As a matter of fact, if a Number, e.g. Number 1 has been deselected during the evaluation of bit i (i varies from 1 to q), $Exout_{1-(i+1)}$ is equal to "1", all the next signals: $Exout_{1-(i+2)}, \ldots, Exout_{1-q}$ will be set to "1". As a result, Number 1 will not be taken into account anymore whatever its value and the values of signals $Bit_{1-(i+1)}, \ldots, Bit_{1-q}$ are inhibited. Because, still in this example limited to the search of the minimum value, the first slice corresponding to bit 1 (i.e. the MSB) must not be deselected when the evaluation process starts, signals $Exout_{1-1}$ to $Exout_{p-1}$ are forced to the logic "0".

In summary, this solution requires as many steps as the quantity q of bits used to code Numbers 1 to p limiting thereby the search process speed and is clearly silicon room consuming.

SUMMARY OF THE PRESENT INVENTION

It is therefore a primary object of the present invention to provide a method and circuits for performing the search of the minimum/maximum value among a set of numbers wherein the response time is significantly improved because several bit slices can be simultaneously processed in parallel in a same step.

It is another object of the present invention to provide a method and circuits for performing the search of the minimum/maximum value among a set of numbers wherein the response time is constant whatever the quantity of numbers among which the search is performed.

It is still another object of the present invention to provide a method and circuits for performing the search of the minimum/maximum value among a set of numbers which save a significant area when implemented in a silicon chip and simplify its connectivity.

The accomplishment of these and other related objects is achieved by the method and circuits according to the present invention.

The method for performing the search of the minimum/maximum value among a set of p numbers referred to as Numbers coded in a binary format on q bits comprises the steps of:
  a) splitting each Number in K sub-values coded on n bits (q<=K×n) and defining a parameter k(k=1 to K) which assigns a rank to each sub-value of a Number, all the sub-values of a same rank forming a slice;
  b) forming the first slice (k=1) composed by the n-bit coded sub-values of the first rank (MSBs);
  c) encoding each n-bit coded sub-value of that slice on m bits (m>n) to form a slice of m-bit encoded sub-values using a coding technique that allows the minimum/maximum value evaluation by an elementary logical function (AND, OR);
  d) searching in parallel among said slice of m-bit encoded sub-values to evaluate the minimum/maximum m-bit encoded sub-value thereof;
  e) deselecting all the Numbers whose m-bit encoded sub-value is greater/lower than the minimum/maximum m-bit encoded sub-value that has been evaluated in step d); and,
  f) repeating steps c) to d) with the next slice (k=k+1) of n-bit coded sub-values until all the slices have been processed (k=K) so that the minimum/maximum value is evaluated as corresponding to the value of the Number(s) not deselected.

The circuit for searching the minimum/maximum value among a set of p numbers referred to as Numbers coded in a binary format on q bits comprises:
  a) minimum/maximum value evaluation means which consist of m p-way AND gates able to perform an AND function on each of the m bits of same weight of p m-bit coded binary words; and,
  b) p blocks, each block being associated to a Number comprising:
    a) splitting means to split each Number in K sub-values (K>=1) of n bits according to relation: q<=K×n;
    b) encoding means connected to said splitting means to encode each n-bit coded sub-value on a m-bit encoded sub-value (m>n) and having its output connected to said minimum/maximum value evaluation means; and,
    c) deselecting means connected to said encoding means;
  wherein the coding technique used in the encoding means allows the minimum/maximum evaluation for the m-bit encoded sub-values generated by all the encoding means of the searching circuit through an AND function;
  wherein the m-bit encoded sub-values generated by all the encoding means of the searching circuit are applied to the minimum/maximum value evaluation means to evaluate the minimum/maximum encoded sub-value among them and to the deselecting means to generate an exclusion signal Exout able to deselect the Number associated to this block when its m-bit encoded sub-value is greater/lower than the minimum/maximum m-bit encoded sub-value that has been evaluated.

The method of the present invention thus significantly improves the response time of the minimum/maximum value search by parallelizing most of the computations if not all, so that it is no longer dependent of the quantity q of bits to code the numbers to be searched so that the number of steps of the minimum/maximum evaluation process can be significantly inferior.

The novel features believed to be characteristic of this invention are set forth in the appended claims. The invention itself, however, as well as these and other related objects and advantages thereof, will be best understood by reference to the following detailed description to be read in conjunction with the accompanying drawings.

DESCRIPTION OF THE PREFERRED EMBODIMENTS

According to the more general aspect of the present invention, the value of each Number coded on q bits is split into a plurality K of smaller values coded on n bits referred to hereinbelow as sub-values. Then, the n-bit coded sub-values are encoded on m bits using an adequate encoder, so that each sub-value can be examined in only one step to allow a search process as quick as possible. This splitting and the use of an encoding function are essential features of the present invention (however, it is to be noted that the splitting is not required in the particular case where n=q). On the other hand, the use of a decoder significantly reduces the hardware that is finally required to physically implement the searching circuits of the present invention.

Figure 2A:
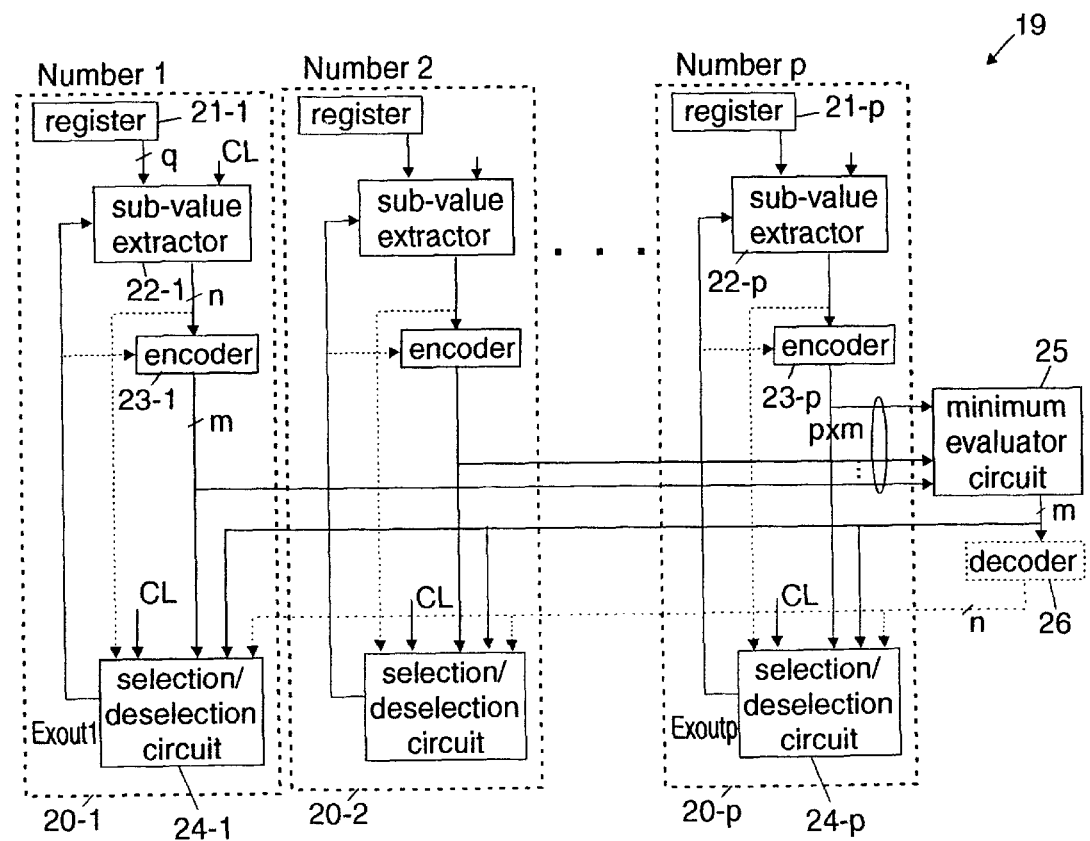
FIG. 2A shows the base architecture of the searching circuit that is used to perform the minimum/maximum value search among p numbers labeled Number 1 to Number p coded on q bits wherein the q bits are processed in a partially parallel operation according to a first preferred embodiment of the present invention.

The architecture of the base searching circuit of the present invention that allows a partially parallel operation is referenced 19 in FIG. 2A. Let us still assume that the minimum value among p numbers (Number 1 to Number p) is to be searched for the sake of simplicity. The same reasoning would directly apply to the search of the maximum value, because minimum and maximum value searches are quite similar. Now turning to FIG. 2A, circuit 19 consists of p identical blocks labeled 20-1 to 20-p. For instance, let us consider block 20-1 for sake of illustration. It first comprises a register 21-1 to store Number 1 coded in a binary format, e.g. on q bits in the present instance, and a sub-value extractor 22-1 whose role is to split the contents of register 21-1 into a determined number K of sub-values, each being coded on n bits (q<=K×n). ). Note that K=1 denotes the absence of splitting. Let us introduce variable k which defines a rank (k=1 to K) for each of the sub-values forming Number 1, and more generally for all the Numbers composing the set, defining thereby a slice of bits to be processed in parallel. In reality, register 21-1 does not necessarily belongs to block 20-1 and could be seen as an external register or a RAM as well.

Figure 1:
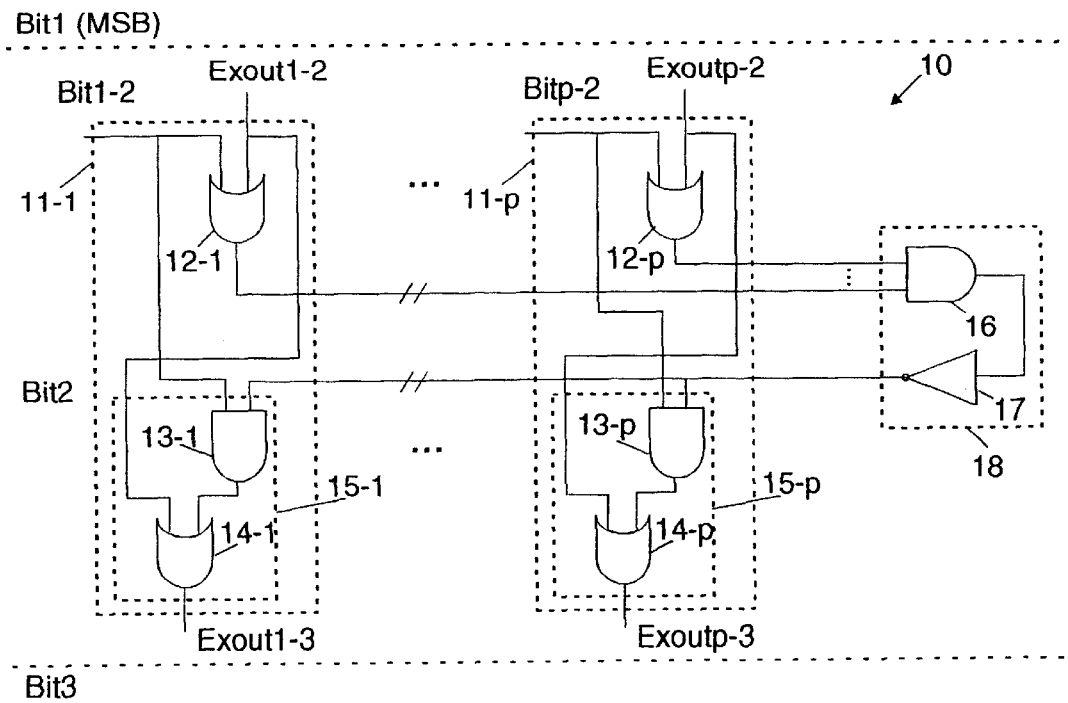
FIG. 1 schematically shows the circuit used to perform the minimum/maximum value search on a bit slice of a set of p numbers such as described in U.S. Pat. No. 5,740,326 mentioned above.

In essence, the sub-value extractor is a shift register provided with a shift control input connected to a sequencer in the control logic CL (not shown in details) to output the sub-values in sequence from slices 1 to K for all the Numbers. It is important to understand that all the sub-values of a same rank forming a slice will be processed within one step during the minimum value evaluation process. For deselected Numbers, the sub-value will be replaced by a neutral value, e.g. a series of n "1" for the minimum search, that will have no influence during the minimum value evaluation process. Block 20-1 further comprises an encoder referenced 23-1 and a selection/deselection circuit 24-1. For each n-bit coded sub-value, the encoder 23-1 generates a corresponding m-bit encoded sub-value that is applied to a first input (comprised of m wires) of said selection/deselection circuit 24-1 and to a minimum evaluator circuit 25, which, in essence, is quite similar to block 18 shown in FIG. 1. The output of the minimum evaluator circuit 25 is applied to a second input (comprised of m wires) of the selection/deselection circuit 24-1 (a similar construction applies each block 20 of circuit 19). Finally, the output of the selection/deselection circuit 24-1 which transports the exclusion signal $Exout_1$ is either connected to the sub-value extractor circuit 22-1 or to the encoder 23-1 in order to force a set of neutral bits in case Number 1 is deselected.

Each of the selection/deselection circuits 24-1 to 24-p includes a latch that is connected to the control logic CL so that at the initial stage of the minimum value evaluation process, all Numbers 1 to Number p are selected. Thus, at initialization, signals $Exout_1$ to $Exout_p$ are set to a logic "0" to allow all Numbers to be processed. As such, searching circuit 19 is adapted to function according to a first operating mode wherein the sub-values generated by the encoders 23-1 to 23-p and the minimum sub-value (as determined by the minimum evaluator circuit 25) in the encoded format (i.e. on m bits) are compared in parallel in each of the selection/deselection circuits 24-1 to 24-p. These circuits generate the exclusion signals $Exout_1$ to $Exout_p$ that have the same role as in the above mentioned U.S. patent to select/deselect the Numbers. When equal to a logic "0", an Exout signal allows the next sub-value to be selected and when equal to a logic "1", it inhibits that sub-value by forcing a set of neutral bits, a series of n "1", as said above. It is necessary to use such an exclusion signal to select or deselect the Numbers during the evaluation of each slice of sub-values of a determined rank. As soon as the result of the evaluation of a sub-value leads to deselect the corresponding Number, the real value of the next sub-values of that Number (yet unprocessed) are not taken into account during the subsequent steps of the minimum value evaluation process. In essence, the operation of searching circuit 19 is essentially parallel in the sense that the p numbers are processed simultaneously, but partially remains sequential in that the numbers are processed slice by slice of n-bit coded sub-values. The minimum value can be found in the register of the still selected Numbers, i.e. those which have an Exout signal equal to logic "0".

In a second operating mode, a decoder 26 is used. In this case, the connections mentioned above between the encoder 23-1 and the selection/deselection circuits 24-1 to 24-p on the one hand and between the minimum evaluator circuit 25 and the selection/deselection circuits 24-1 to 24-p on the other hand do not exist any longer (it just remains the connection between the encoder 23-1 and the minimum evaluator circuit 25). In the present case, the output of sub-value extractor 22-1 is connected to said first input of the selection/deselection circuits 24-1. The output of minimum evaluator circuit 25 is no longer directly applied to the selection/deselection circuits 24-1 to 24-p but to a decoder 26. In turn, the output of decoder 26 is applied to said second input of each of said selection/deselection circuits 24-1 to 24-p. A similar construction applies each block 20 of circuit 19. As a result, a comparison is still performed between the sub-values and the minimum sub-value (such as evaluated by the minimum evaluator circuit 25) but now on the non-encoded format (i.e. n bits) instead of the encoded one (i.e. m bits). This second operating mode is illustrated in FIG. 2A by dotted lines. Use of a decoder may reveal to be worthwhile when the search of the minimum/maximum evaluation value is performed among a great quantity of Numbers, because it causes a significant hardware simplification in each of the selecting/deselecting circuit 24.

Figure 2B:
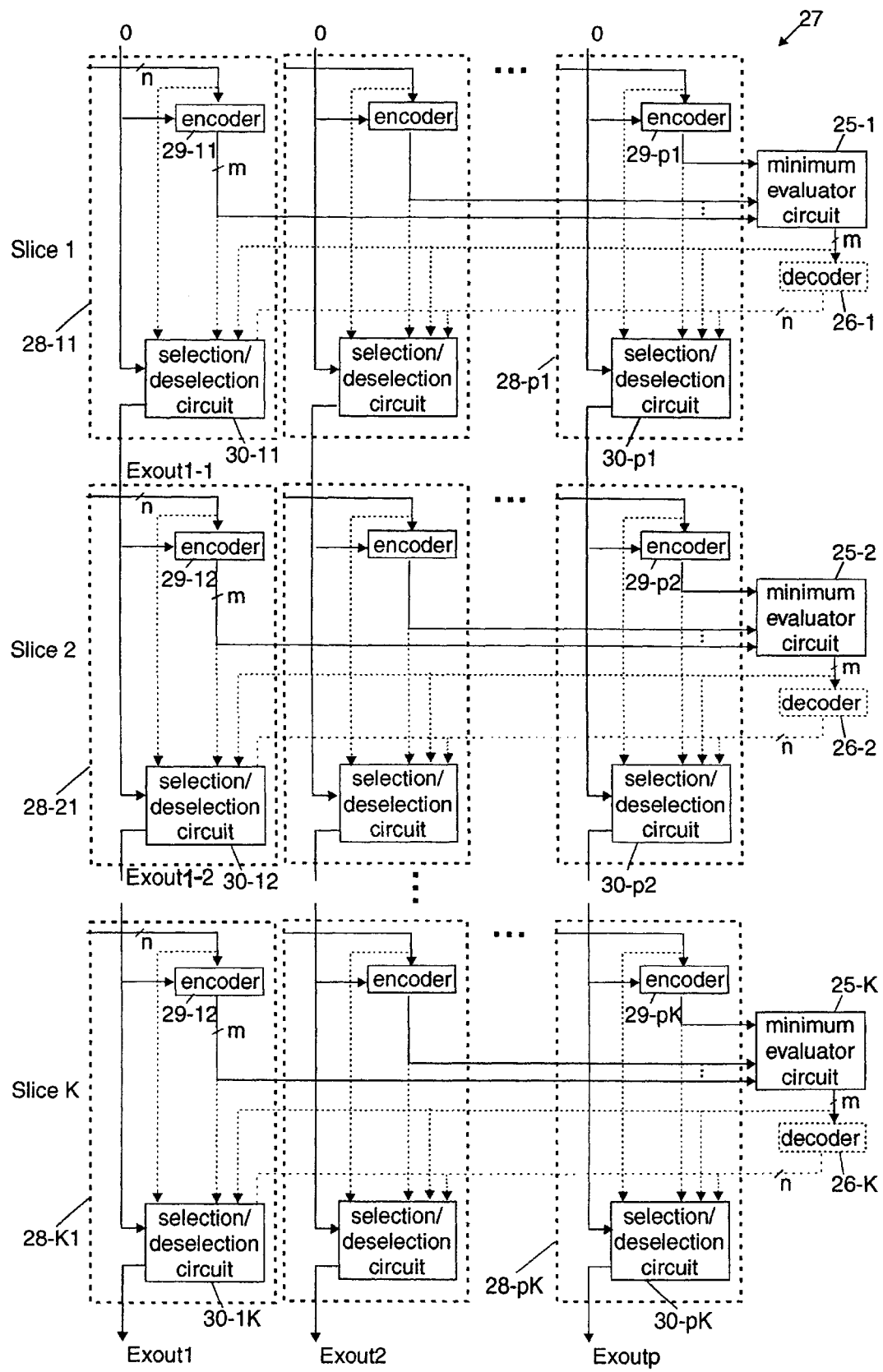
FIG. 2B shows another architecture of the searching circuit of FIG. 2A wherein the q bits are processed in a totally parallel operation according to a second preferred embodiment of the present invention.

FIG. 2B shows another architecture referenced 27 that is directly derived from the searching circuit 19 architecture to allow a totally parallel operation still according to the present invention. With regards with the FIG. 2A circuit, the sub-value extractors 23 are no longer necessary, the innovative portion of block 20 now generically referenced 28, only includes the encoder 29 and the selection/deselection circuit 30. Each slice (there are K slices) is dedicated to process the sub-values of a determined rank that are stored in the corresponding registers as described above. The main difference lies in the exploitation of the Exout signal which is applied to the encoder and the selection/deselection circuit of the next slice. As apparent in FIG. 2B, signal $Exout_{1-1}$ is applied to encoder 29-12 and selection/deselection circuit 30-12. Note that a logic "0" is applied to encoders 29-11 to 29-p1 of slice 1 (MSB) so that all the sub-values of the first slice are selected when the evaluation process is initiated.

In the above description, it should be understood that the present invention is not limited to circuit 25 to search the minimum value, but to any circuit adapted to search the maximum value or a determined value in a set of numbers.

The goal of encoders generically referenced 23 and 29 in FIGS. 2A and 2B respectively is to transform a n-bit coded sub-value into a m-bit encoded one, where m is greater than n. Moreover, they must have certain characteristics in order to allow the minimum sub-value evaluation to be performed on all the m bits in the same step. The details of the relations between parameters n, q, K and m will be given later on, but in essence, the relation is dictated by the best compromise between the speed (K must be minimal and thus n as great as possible) and the hardware connectivity (i.e. the number of wires) which depends on m must be minimized. For instance, a coding technique usually referred to as the "thermometric" (or "barometric") coding in the technical literature is adequate in all respects.

FIG. 3(a) illustrates a practical example of this coding technique which allows to perform an easy parallel search on a plurality of sub-values. Now turning to FIG. 3(a), four sub-values (resulting of the splitting of corresponding Numbers 1 to 4) of the same rank, i.e. belonging to the same slice, labeled Sub-value1 to Sub-value4, encoded on m=7 bits (bit 0 to bit 6) are processed in a parallel manner to evaluate the minimum value of that slice. To obtain the desired result (the minimum sub-value), a logical AND is performed on all bits of a same weight. In the example illustrated in FIG. 3(a), the respective values of Sub-value1 to Sub-value4 are 5, 4, 3 and 6. The minimum sub-value is thus Sub-value3 which is equal to 3.

FIG. 3(b) just shows a variant of the example illustrated in FIG. 3(a). As apparent in FIG. 3(b), for each Sub-value and the minimum Sub-value, any bit after the first bit equal to "0" is not significative and thus can be represented by either value "0" or "1", in this case by an "X" (don't care).

However, as known for those skilled in the art, it exists other coding techniques or variants of the above described "thermometric" coding technique. In addition, instead of starting from LSB (bit 0) to MSB (bit 6), the opposite way (from MSB to LSB) could be used as well. Likewise, if a complementary logic is used, OR gates should be used instead of AND gates according to De Morgan rules. As a matter of fact, any encoding technique which allows to parallelize the minimum sub-value evaluation for a slice would be appropriate. It is an essential feature of the present invention, that the above described encoding technique allows said evaluation be performed by an elementary logical function, in this case, an AND function.

In summary, in the global minimum value evaluation process, all the p encoded sub-values of the same rank are simultaneously processed to determine the minimum sub-value for a slice. Each slice of a same rank from MSB to LSB is processed in parallel using a quantity m of p-way AND gates. As a consequence, the search for the minimum among a set of sub-values can be performed in only one step. With the circuit 19 of FIG. 2A, the K sub-values are processed in sequence, rank after rank (or slice after slice), until the totality of the q bits forming each of Number 1 to Number p is processed. However, the K sub-values can be also processed in parallel if the circuit 27 of FIG. 2B is used instead. Note that in both cases, as soon as a Number is deselected, the remaining sub-values are no longer processed, because they are replaced by a set of neutral bits as explained above.

Figure 4:
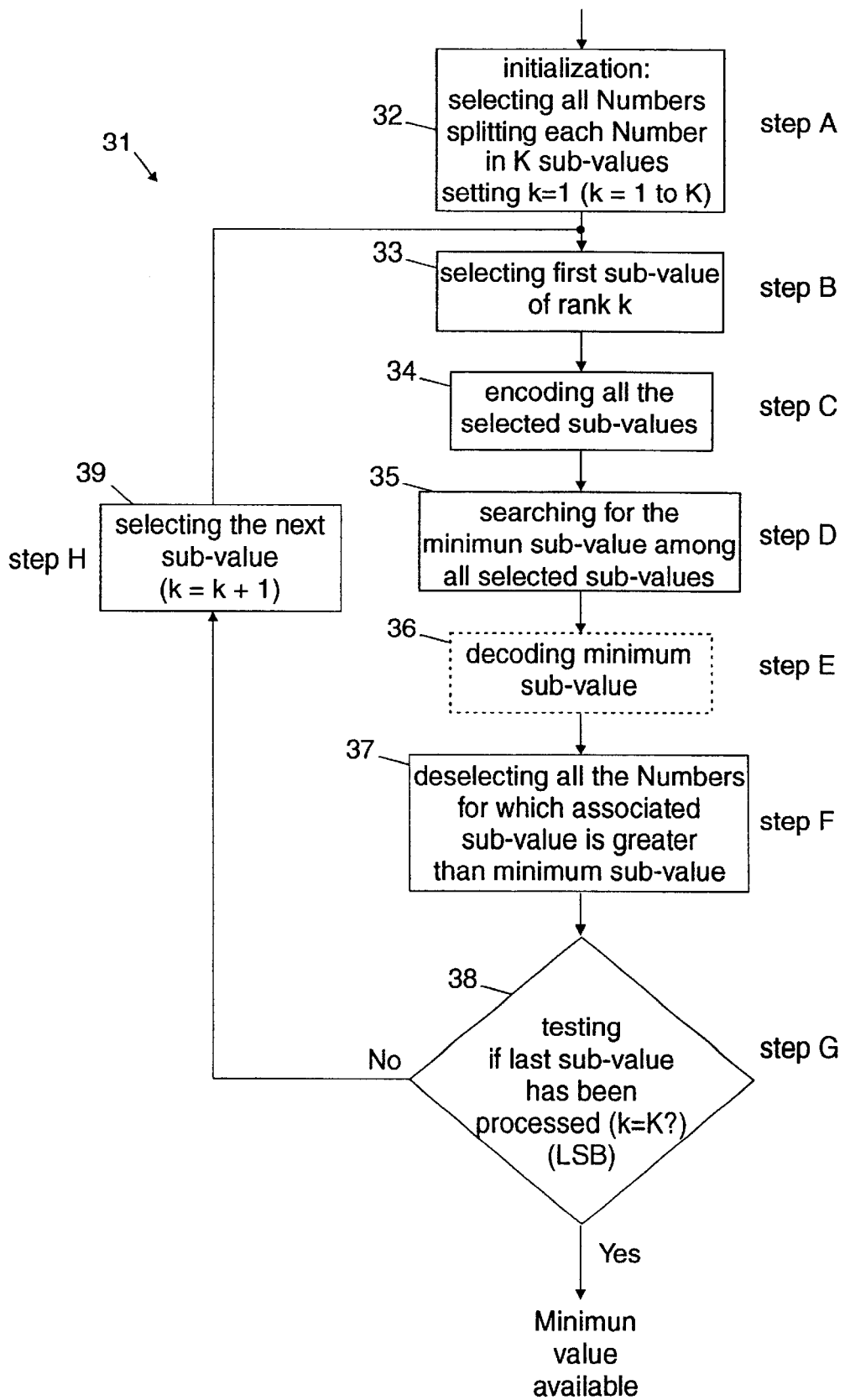
FIG. 4 shows the essential steps of the algorithm at the base of the method of the present invention.

The method of the present invention will be now described in more details by reference to the algorithm referenced 31 in FIG. 4 which is consistent with the hardware of FIG. 2A. The algorithm 31 which is comprised of boxes 32–39 (corresponding to steps A–H respectively) illustrates the second operating mode mentioned above which relies upon the use of a decoder.

Now turning to FIG. 4, at the initial stage of the evaluation process, all the Numbers in which the minimum value is to be searched are selected. Each Number is split up in K sub-values. To have the sub-values of the first rank (which represent the MSBs) ready for processing, a variable k which is related to the rank (k varies from 1 to K) is set to 1 (step A). Let us be now more general, for each Number, the sub-values of rank k are selected (step B). Now, in order to perform a minimum value search evaluation on these selected sub-values in a single step, they are encoded using the "thermometric" coding technique described above by reference to FIG. 3 (step C). It is now possible to evaluate the minimum sub-value among all said selected sub-values (step D). The minimum sub-value is decoded (step E), then it is compared with selected sub-values to deselect all the Numbers associated to sub-values that are greater than the minimum sub-value (step F). After this deselecting step, a test is performed to determine whether the sub-values representing the LSBs have been reached or not, i.e. if k=K or not (step G) If not, the above sequence of steps B to G is repeated by incrementing variable k (step H) so that the next rank of sub-values is selected, then processed the same way. If yes, the evaluation process stops, the minimum value has been evaluated and is available to the user. The minimum value is thus the value of Number(s) associated to block(s) still not deselected. If the algorithm 31 is carried out in a time frame (i.e. sequentially) it is consistent with FIG. 2A circuit 19 and when carried out in a space frame (i.e. in parallel) it is consistent with the FIG. 2B circuit 27.

In the first operating mode, step E is no longer necessary, the comparison is performed between the selected encoded sub-values and the minimum encoded sub-value.

Figure 5:
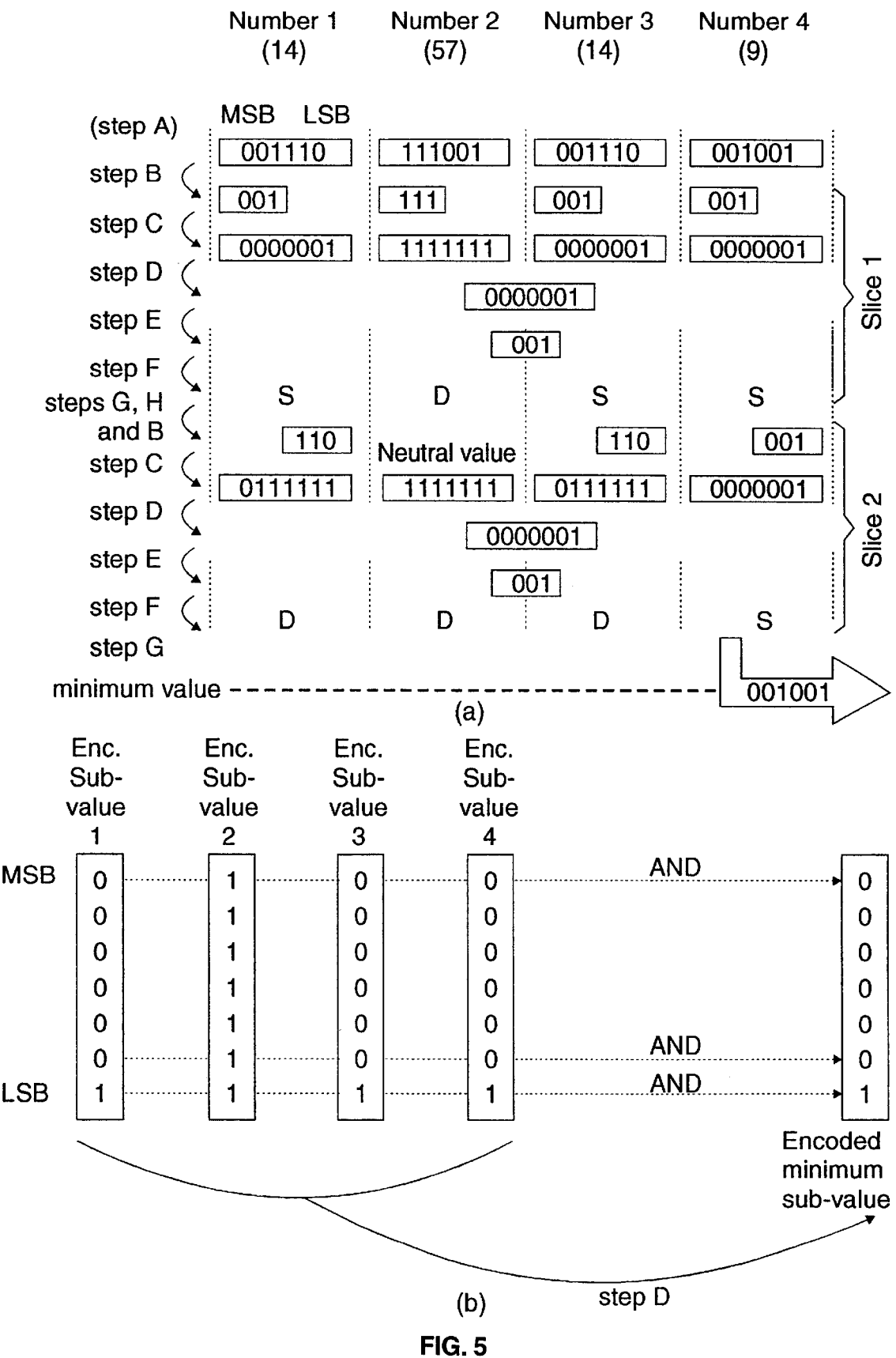
FIG. 5 which is comprised of FIGS. 5(a) and 5(b) illustrates the method of the present invention in the particular step of searching the minimum value among a set of 4 numbers for the sake of illustration.

The above method will be now illustrated by the practical example described by reference to FIGS. 5(a) and 5(b). As apparent in FIG. 5(a), four Numbers (i.e. p=4): 14, 57, 14 and 9 on which the minimum search is performed are coded on q=6 bits. At initialization, all the Numbers are selected. We choose to split each Number in two sub-values (K=2) coded on n=3 bits and variable k is set to 1 (step A). The sub-values of rank 1 forming slice 1, i.e. the MSBs, are selected and ready for processing (step B). Using the "thermometric" coding technique described above by reference to FIG. 3, the sub-values are now coded on m=7 bits, for instance 001 becomes 0000001 (step C). Now, it is possible to evaluate the minimum sub-value using the minimum evaluator circuit 25 which, in essence, performs an AND function on each bit of all the selected sub-values (step D). FIG. 5(b) illustrates step D in more details to demonstrate that the result is obtained in a totally parallel manner and is performed in a single step according to an essential feature of the present invention. If allowed by the performance of the system said single step may consist of a single clock cycle. The minimum sub-value that is obtained in the instant example is 0000001. Turning again to FIG. 5(a), this minimum sub-value is then decoded, in this case, it is equal to 001 (step E). Now, it is compared with each selected sub-values to deselect all Numbers whose sub-values are greater (step F). As a result, Number 2 having a value of 57 is deselected, because "111" is greater than "001", and a "D" is assigned to them (D stands for Deselected). The remaining sub-values of that Number will be assigned the neutral value (1111111). Others Numbers remain selected and an "S" is assigned to them (S stands for Selected). A test is performed to determine if it remains unprocessed sub-values (step G), which is the case in the example depicted in FIG. 5(a), so that the above sequence of steps (B to G) needs to be repeated now for the LSBs (k=2). During the processing of sub-values of the second rank forming slice 2, Numbers 1 and 3 are deselected, so that at the end of the evaluation process, Numbers 1, 2 and 3 are deselected and the winner is Number 4 having a value of 9 (binary value=001001). As a result, the minimum value of the four Numbers 1 to 4 coded on 6 bits has been found in two steps because K=2.

Therefore, as mentioned above, this response time does not depend upon anymore neither of the quantity p of Numbers in which the minimum is searched (four in the present case) nor of parameter q (six in the present case), but of parameter K which defines the splitting of the Numbers (two in the example shown in FIG. 5(a). It is now possible to search for the minimum value among a set of Numbers in less steps than the number of bits on which these Numbers are coded. As a matter of fact, with Numbers coded on q bits, the required number of steps is equal to K, with K<q (in the present case 2 vs 6). It is always possible to find an optimal set of parameters by selecting the adequate values for K (number of required steps, and thus the speed) and n (size of sub-values) to reach the desired value for m (the connectivity). This optimal set is not an absolute one, it depends on the goal of the application, the technology used for the physical implementation, the performance of the desired system, etc.

Figure 3:
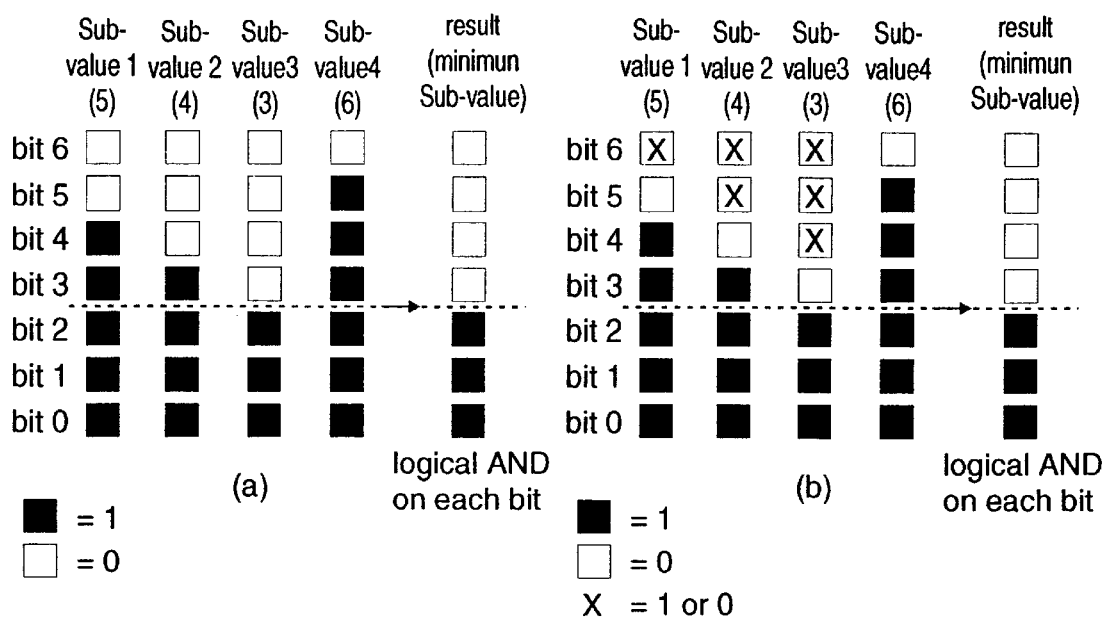
FIG. 3 which is comprised of FIGS. 3(a) and 3(b) illustrate two variants of the conventional "thermometric" technique of coding.
Figure 6A:
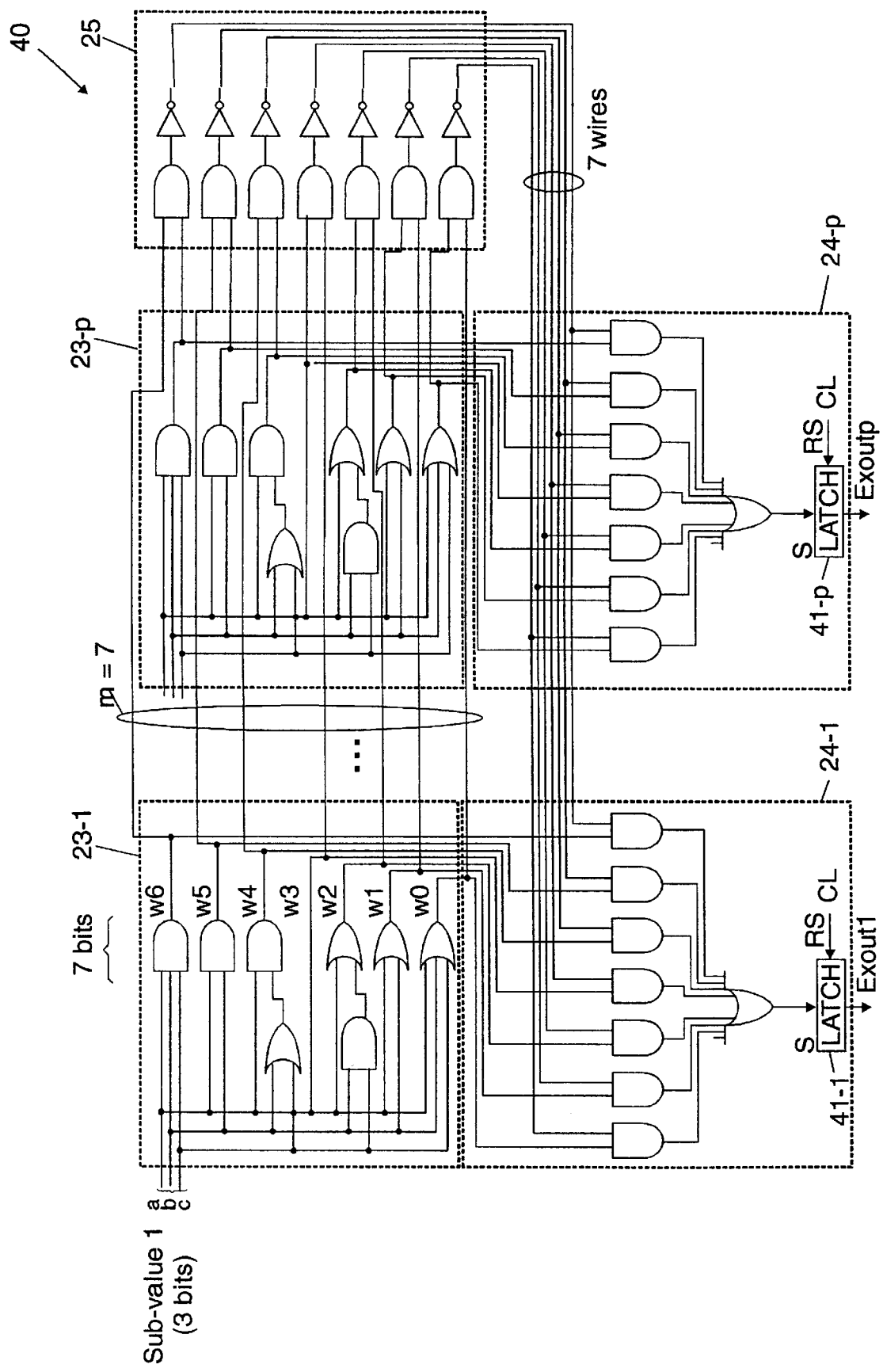
FIGS. 6A and 6B respectively show an hardware implementation of the main circuits forming the innovative searching circuit of FIG. 2A without and with a decoder.

Let us now consider a first physical implementations of the FIG. 2A circuit without the decoder 26 (many other implementations can be envisioned as well) that is illustrated in FIG. 6A. In this implementation, sub-values are coded on n=3 bits: a, b, and c (where a represents the MSB). Due to the classical "thermometric" coding technique used in the method of the present invention, 7 bits ($w_0$ to $w_6$) are required to encode the sub-values as illustrated in FIG. 3.

Now turning to FIG. 6A, there is shown a circuit referenced 40 which includes the main elements of circuit 19 (i.e. the encoders 23, selection/deselection circuits 24 and the minimum evaluator circuit 25).

In this first implementation, the logical equations representing an encoder 23 (e.g. 23-1) are:

$w_0 = a + b + c$ $w_1 = b + c$ $w_2 = (a \cdot b) + c$ $w_3 = c$ $w_4 = (a+b) \cdot c$ $w_5 = b \cdot c$ $w_6 = a \cdot b \cdot c$ The detailed physical construction of an encoder meeting these equations is detailed in FIG. 6A. Adequate circuits to perform the minimum value evaluation and the selection/deselection functions are still referenced 25 and 24-1 to 24-p respectively for the sake of simplicity. As apparent in FIG. 6A, these circuits are directly derived from circuits 18 and 15 of FIG. 1 respectively that are state-of-the-art for the skilled professional. As apparent in FIG. 6A, the output signal Exout$_1$ is stored in a latch 41-1 via the set input S and then available for any use while the reset input RS is connected to the control logic CL. In this implementation, signal Exout$_1$ is applied to the sub-value extractor 22-1 (FIG. 2A). At initialization, before the evaluation process takes place, all latches 41-1 to 41-p are set to "0" so that all Numbers are selected.

A second implementation of the FIG. 2A circuit which is preferred because it significantly reduces the required hardware without increasing the time delays will be now described by reference to FIG. 6B. Circuit 42 is based on the use of the decoder 26 which is common for the whole searching circuit 19 of FIG. 2A. In the present case, the circuits composing an encoder 23 is different from the one described above by reference to FIG. 6A, because a variant of the "thermometric" coding technique shown in FIG. 3 is now used for convenience. Let us still assume that sub-values are coded on 3 bits a, b and c.

Figure 6B:
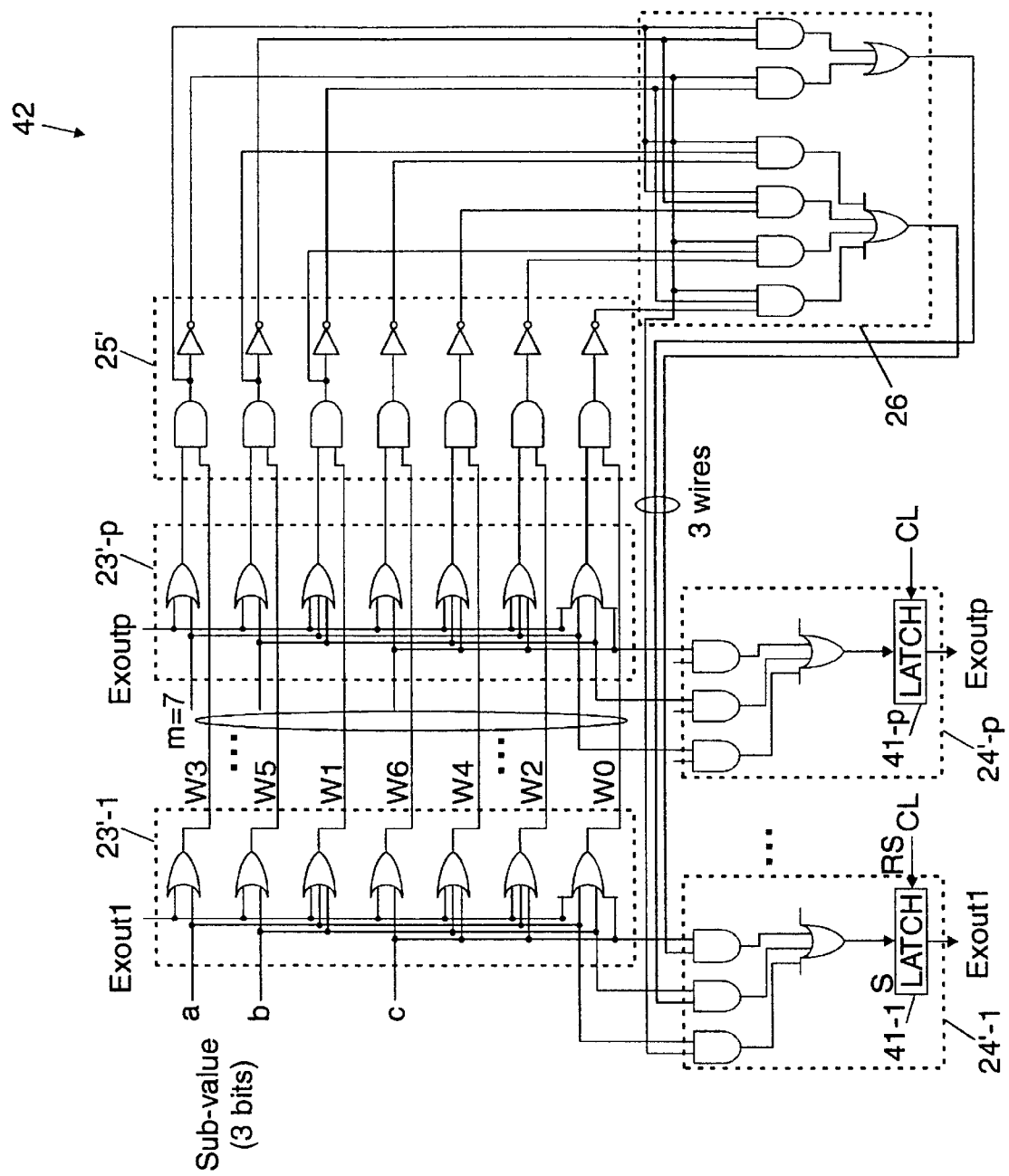

In this second implementation, the logical equations representing an encoder now referenced 23' (e.g. 23'-1) now becomes:

$w_0 = a + b + c + \text{Exout1}$ $w_1 = a + b + \text{Exout1}$ $w_2 = a + c + \text{Exout1}$ $w_3 = a + \text{Exout1}$ $w_4 = b + c + \text{Exout1}$ $w_5 = b + \text{Exout1}$ $w_6 = c + \text{Exout1}$ As apparent in FIG. 6B, the Exout signal controls the encoder 23' instead of the sub-value extractor as it was the case in the FIG. 6A circuit. The elementary circuits composing the selection/deselection circuit now referenced 24'-1 have been significantly simplified with regards to circuit 24-1 of FIG. 6A, but still incorporate the latch 41-1. Decoder 26 is of standard construction for the skilled professional, its role is to transform 7-bits coded words ($w_0$ to $w_6$) in 3-bits coded words. As far as the minimum evaluator circuit is concerned, they are no significant differences. Note that they are only three wires at the output of decoder 26 in circuit 42 instead of seven wires at the output of the minimum evaluator circuit 25 of circuit 40 to drive the selection/deselection circuits 24 (in FIG. 6A) or 24' (in FIG. 6B). These simplifications result from the use of decoder 26 at the cost of little additional room in circuit 42. Implementation of a decoder is worthwhile for a quantity p of Numbers greater than 10.

Figure 7:
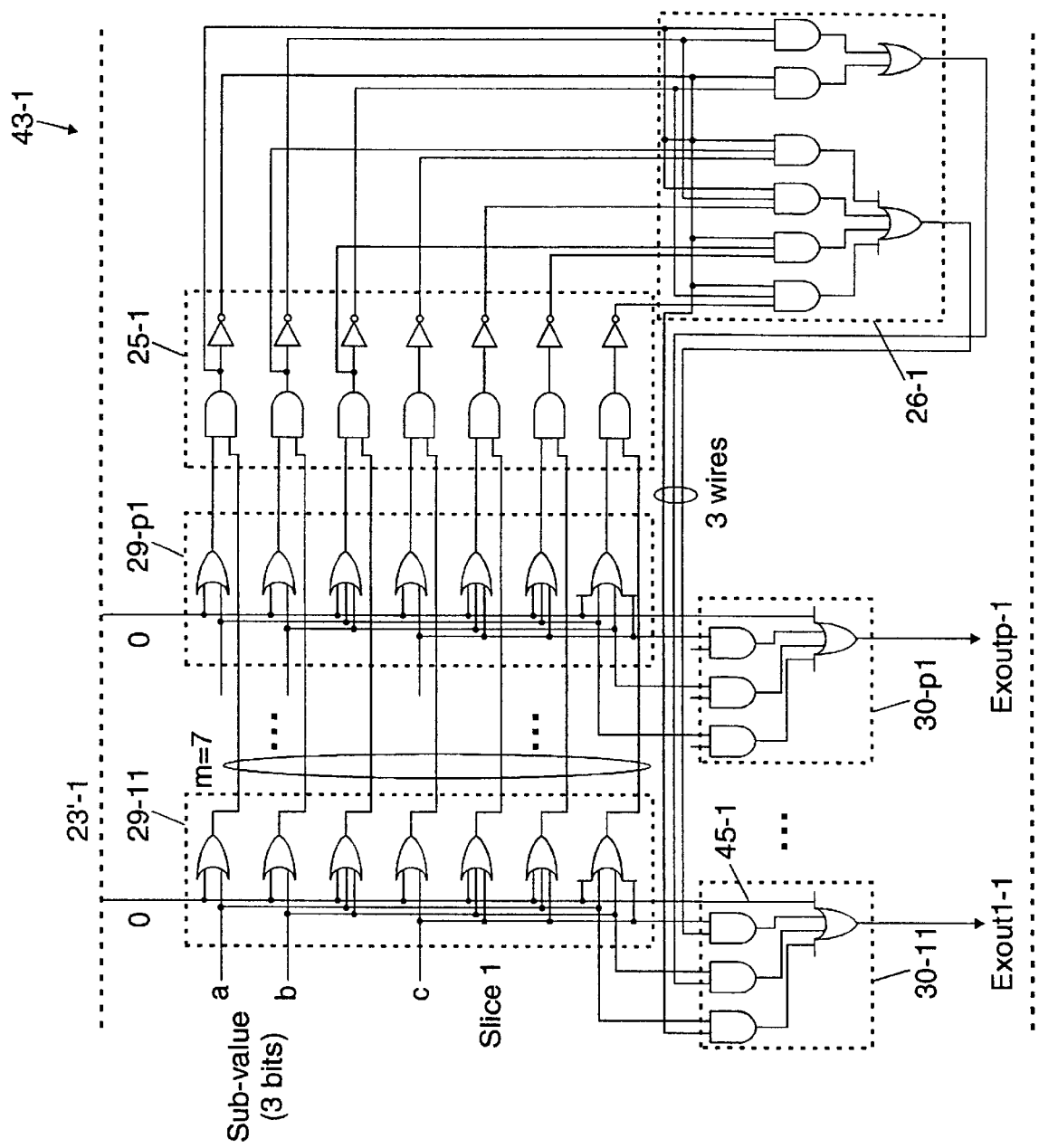
FIG. 7 shows an hardware implementations of the main circuits of a slice of the innovative searching circuit of FIG. 2B with a decoder.

FIG. 7 shows the main elements of the circuit processing the first slice of bits (Slice 1) of the FIG. 2B circuit 27. The physical implementation shown in FIG. 7 which bears numeral 43-1 incorporates encoders 29 (identical to encoders 23'), selection/deselection circuits 30 (identical to circuits 24'), minimum evaluator circuit 25 (identical to circuit 25') and decoder 26. As apparent in FIG. 7, circuit 43-1 is identical to circuit 42 of FIG. 6B except in that the latches 41 are no longer necessary in the selection/deselection circuits 24'.

One important advantage of the hardware implementation of FIG. 6A (without a decoder) concerns the system test facilities. In this case, the minimum value can be probed on the seven wires and thus can be easily interpreted. As a consequence, the detection of any potential short or open is very easy. On the other hand, due to the lack of a decoder, it is necessary to use a greater number of wires to feed the selection/deselection circuits 7 wires as shown in FIG. 6A instead of 3 as shown in FIG. 6B.

The examples discussed above by reference to FIGS. 6A, 6B and 7, are directed to sub-values coded on n=3 bits. The number of required wires at the output of an encoder 23 is equal to m and is related to n by the relation: $m = 2^n - 1$. The table below illustrates the number of required steps versus the number m of required wires and the number n of bits to code a sub-value. This table allows to choose the best adapted tradeoff related to the application concerning the response time (i.e. the number of steps) versus the number of wires.

TABLE

| Number of bits to code a sub-value (n) | Number of required steps with the prior art (sequential) method | Number (K) of required steps with the present method | Number of required wires (m) |
|---|---|---|---|
| 16 | 16 | 16 | $1 = 2^1 - 1$ |
| 16 | 16 | 8 | $3 = 2^2 - 1$ |
| 14 | 14 | 7 | |
| 12 | 12 | 6 | |
| 10 | 10 | 5 | |
| 8 | 8 | 4 | |
| 15 | 15 | 5 | $7 = 2^3 - 1$ |
| 12 | 12 | 4 | |
| 9 | 9 | 3 | |
| 6 | 6 | 2 | |
| 16 | 16 | 4 | $15 = 2^4 - 1$ |
| 12 | 12 | 3 | |
| 8 | 8 | 2 | |
| 4 | 4 | 1 | |
| 15 | 15 | 3 | $31 = 2^5 - 1$ |
| 16 | 16 | 2 | $255 = 2^8 - 1$ |

As illustrated in FIGS. 6B and 7, encoders are associated to each sub-value in order to perform a fast encoding operation. It has also to be understood that according to the present invention only one decoder could be used for the whole searching circuit to reduce the size of the required hardware. In addition, it is to be noted that although minimum/maximum evaluator circuit 25 and decoder 26 have been implemented in searching circuits 19 and 27 as two common units servicing blocks 20-1 to 20-p and blocks 28-11 to 28-1p (for Slice 1) respectively, they can be distributed in each of said blocks as well. In particular it can be worthwhile to distribute the AND function in each of blocks using either a two-way AND gate (an input being connected to the previous block and the output to the next block or by dotting as standard.

While the invention has been particularly described with respect to a preferred embodiment thereof it should be understood by one skilled in the art that the foregoing and other changes in form and details may be made therein without departing from the spirit and scope of the invention.

We claim:

1. A method for searching for a desired extreme value, the desired extreme value being one of a minimum value and a maximum value, among a set of numbers each coded in a binary format on q bits, the method comprising the steps of:
   (a) splitting each number into K sub-values each coded on n bits and characterized as n-bit sub-values, where n, q and K satisfy the relation $q \leq K \times n$, and assigning a rank to each said n-bit sub-value of a given number, the rank designated by a variable k intialized at k=1, said splitting not being performed when K=1;
   (b) forming a kth slice including all the n-bit sub-values of the kth rank;
   (c) encoding each n-bit sub-value of the slice formed in step (b) on m bits, where m>n, to form a slice of m-bit encoded sub-values using a coding technique that allows evaluation of the desired extreme value by a logical function selected from the group consisting of AND and OR;
   (d) when the minimum value among the set of numbers is desired, searching said slice of m-bit encoded sub-values in parallel to evaluate the minimum m-bit encoded sub-value thereof, and when the maximum value among the set of numbers is desired, searching said slice of m-bit encoded sub-values in parallel to evaluate the maximum m-bit encoded sub-value thereof;
   (e) when the minimum value among the set of numbers is desired, deselecting all the numbers whose m-bit encoded sub-value is greater than the minimum m-bit encoded sub-value evaluated in step (d), and when the maximum value among the set of numbers is desired, deselecting all the numbers whose m-bit encoded sub-value is less than the maximum m-bit encoded sub-value evaluated in step (d); and
   (f) repeating steps (b) to (e) with a next slice of n-bit sub-values, k being incremented by 1, until all said slices are processed, the desired extreme value thus corresponding to the value of the number not deselected.

2. The method of claim 1 wherein the the n-bit coded sub-values of the first rank with k=1 represent the most significant bits (MSBs).

3. The method of claim 1 wherein said step (c) is performed using a thermometric technique.

4. A circuit for searching for a desired extreme value, the desired extreme value being one of a minimum value and a maximum value, among a set of p numbers coded in a binary format on q bits, the circuit comprising:
   (a) extreme value evaluation means, including m p-way AND gates, for performing an AND function on each of m bits of a same weight of p m-bit coded binary words; and
   (b) p blocks, each block being associated with a number in the set and including
      (1) splitting means to split each number into K sub-values of n bits characterized as n-bit sub-values, where $K \geq 1$ and $q \leq K \times n$,
      (2) encoding means, connected to said splitting means, for encoding each of the n-bit sub-values on m bits, where m>n, to form m-bit encoded sub-values, said encoding means having an output thereof connected to said extreme value evaluation means,
      wherein the m-bit encoded sub-values formed by said encoding means are output to said extreme value evaluation means to evaluate a desired extreme m-bit encoded sub-value among all the m-bit encoded sub-values, said encoding means using an encoding process allowing evaluation of the desired extreme m-bit encoded sub-value by the AND function, and
      (3) deselecting means, connected to said encoding means, for deselecting the number associated with a given block, when the desired extreme value is the minimum value and an m-bit encoded sub-value corresponding to said number is greater than said desired extreme m-bit encoded sub-value evaluated by said evaluation means, and when the desired extreme value is the maximum value and an m-bit encoded sub-value corresponding to said number is less than said desired extreme m-bit encoded sub-value evaluated by said evaluation means.

5. The circuit of claim 4 wherein said deselecting means further comprises means for selecting all the numbers when the searching is initialized.

6. The circuit of claim 5 wherein said deselecting means further comprises means for generating a neutral value in the encoding means when a number is deselected.

7. The circuit of claim 4 wherein the extreme value evaluation means is distributed in each of the p blocks.

8. A circuit for searching for a desired extreme value, the desired extreme value being one of a minimum value and a maximum value, among a set of p numbers coded in a binary format on q bits, the circuit comprising:

(a) extreme value evaluation means, including m p-way AND gates, for performing an AND function on each of m bits of a same weight of p m-bit coded binary words;

(b) decoding means, connected to said extreme value evaluation means, for transforming an m-bit coded word into an n-bit coded word, where n<m; and (c) p blocks, each block being associated with a number in the set and including
  (1) splitting means to split each number into K sub-values of n bits characterized as n-bit sub-values, where $K \geq 1$ and $q \leq K \times n$,
  (2) encoding means, connected to said splitting means, for encoding each of the n-bit sub-values on m bits, where m>n, to generate m-bit encoded sub-values, thereby generating encoded words, said encoding means having an output thereof connected to said extreme value evaluation means, said encoding means using an encoding process allowing evaluation of the desired extreme value for all the encoded words generated by all said encoding means using the AND function, and
  (3) deselecting means, connected to said splitting means and to said encoding means, for deselecting a number, wherein
  the m-bit encoded sub-value generated by the encoding means is applied, with all the m-bit encoded sub-values generated by other blocks, to the extreme value evaluation means to evaluate the desired extreme m-bit encoded sub-value, and
  the desired extreme m-bit encoded sub-value is applied to the decoding means to generate a desired extreme n-bit coded sub-value which is compared with an n-bit coded sub-value in said deselecting means to generate an exclusion signal to deselect the number associated with a given block, when the desired extreme value is the minimum value and an n-bit coded sub-value corresponding to said number is greater than said desired extreme n-bit coded sub-value, and when the desired extreme value is the maximum value and an n-bit coded sub-value corresponding to said number is less than said desired extreme n-bit encoded sub-value.

9. The circuit of claim 8 wherein said extreme value evaluation means is distributed in each of the p blocks.

* * * * *